(12) United States Patent
Dudley et al.

(10) Patent No.: US 8,788,354 B2
(45) Date of Patent: Jul. 22, 2014

(54) SYSTEM AND METHOD FOR OPERATOR CHARGING GATEWAY

(75) Inventors: William H. Dudley, Lovettsville, VA (US); Robert C. Lovell, Jr., Leesburg, VA (US)

(73) Assignee: SYBASE 365, Inc., Dublin, CA (US)

( * ) Notice: Subject to any disclaimer, the term of this patent is extended or adjusted under 35 U.S.C. 154(b) by 2004 days.

(21) Appl. No.: 11/737,388

(22) Filed: Apr. 19, 2007

(65) Prior Publication Data

US 2007/0250399 A1 Oct. 25, 2007

Related U.S. Application Data

(60) Provisional application No. 60/793,304, filed on Apr. 20, 2006.

(51) Int. Cl.
G06Q 30/00 (2012.01)
H04M 11/00 (2006.01)

(52) U.S. Cl.
USPC .......... 705/26.1; 455/408; 455/414.1

(58) Field of Classification Search
USPC .......... 379/201.01; 455/556.1, 556.2, 455/405–408, 414.1, 414.3, 422.1, 456.1, 455/456.3; 705/26, 26.1, 26.7, 26.81, 705/26.82; 709/201, 217, 223, 231
See application file for complete search history.

(56) References Cited

U.S. PATENT DOCUMENTS

| 5,799,072 | A  * | 8/1998 | Vulcan et al. ............. 379/114.02 |
| 6,459,779 | B2 * | 10/2002 | Wardin et al. ............. 379/112.01 |
| 6,977,743 | B2 * | 12/2005 | Carlton .................... 358/1.15 |
| 7,114,179 | B1 * | 9/2006 | Ritter et al. ................ 726/7 |
| 7,171,189 | B2 * | 1/2007 | Bianconi et al. ............ 455/408 |
| 7,181,193 | B2 * | 2/2007 | Ansamaa .................... 455/406 |
| 7,181,766 | B2 * | 2/2007 | Bendinelli et al. ........... 726/15 |
| 7,222,165 | B1 * | 5/2007 | Ellis et al. ................. 709/223 |
| 7,450,591 | B2 * | 11/2008 | Korling et al. ........... 370/395.43 |
| 7,558,283 | B2 * | 7/2009 | Zheng ..................... 370/437 |
| 7,635,084 | B2 * | 12/2009 | Wang et al. ............... 235/379 |
| 7,653,735 | B2 * | 1/2010 | Mandato et al. ............ 709/231 |
| 7,672,317 | B2 * | 3/2010 | Gateva et al. .............. 370/401 |
| 7,702,311 | B2 * | 4/2010 | Mizell et al. ............... 455/406 |
| 7,783,534 | B2 * | 8/2010 | Armstrong et al. ........... 705/29 |
| 7,844,250 | B2 * | 11/2010 | Olsson et al. .............. 455/408 |
| 7,979,569 | B2 * | 7/2011 | Eisner et al. ............... 709/231 |
| 8,620,989 | B2 * | 12/2013 | Eisner et al. ............... 709/201 |
| 2004/0019539 | A1 | 1/2004 | Raman et al. |
| 2004/0230489 | A1 | 11/2004 | Goldthwaite et al. |
| 2005/0027543 | A1 | 2/2005 | Labrou et al. |
| 2006/0006226 | A1 | 1/2006 | Fitzgerald et al. |

OTHER PUBLICATIONS

PCT International Search Report and Written Opinion of the International Searching Authority.

* cited by examiner

Primary Examiner — Andrew Joseph Rudy
(74) Attorney, Agent, or Firm — Kenyon & Kenyon LLP

(57) ABSTRACT

An Operator Charging Gateway (OCG) facility within a Mobile Commerce environment that, among other things, provides a bearer-independent and delivery-agnostic charging platform that, inter alia, (a) uncouples all of the particulars of the delivery of content, services, etc. from the myriad of activities, challenges, etc. of charging and (b) adds substantial value to each of the involved parties (including, for example, Mobile Subscribers, Operators, Merchants, etc.). Within a wireless messaging ecosystem an OCG may leverage the capabilities of a centrally-located, full-featured Value-Added Service Provider.

14 Claims, 15 Drawing Sheets

| FIELD NAME | SIZE | FROM | TO | FORMAT | REQ'D? | DESCRIPTION | NOTES |
|---|---|---|---|---|---|---|---|
| FILE HEADER | | | | | | | |
| RECORD IDENTIFIER | 2 | 1 | 2 | A(2) | YES | THE IDENTIFIER FOR THE RECORD TYPE. | STATIC 'FH' |
| FILE ID | 6 | 3 | 8 | N(6), RIGHT ALIGNED, 0 FILLED | YES | THE FILE ID | |
| SENDER NAME | 16 | 9 | 24 | AN(16), LEFT ALIGNED, SPACE FILLED | YES | THE SENDER OF THE FILE | |
| RECEIVER NAME | 16 | 25 | 40 | AN(16), LEFT ALIGNED, SPACE FILLED | YES | THE RECEIVER OF THE FILE | |
| FILE TYPE | 4 | 41 | 44 | A(4) | YES | SETTLEMENT FILE | STATIC 'STMT' |
| FILE DATE | 8 | 45 | 52 | N(8), CCYYMMDD | YES | THE DATE FILE GENERATED (IN GMT TIME). | |
| FILE NAME | 64 | 53 | 116 | AN(64), LEFT ALIGNED, SPACE FILLED | YES | THE FILE NAME | |
| FILLER | | | | | NO | SPACE FILLED | |
| FILE FOOTER | | | | | | | |
| RECORD IDENTIFIER | 2 | 1 | 2 | A(2) | YES | THE IDENTIFIER FOR THE RECORD TYPE. | STATIC 'FT' |
| FILE ID | 6 | 3 | 8 | N(6), RIGHT ALIGNED, 0 FILLED | YES | THE FILE ID (MUST MATCH THE FILE ID IN THE FILE HEADER) | |
| SENDER NAME | 16 | 9 | 24 | AN(16), LEFT ALIGNED, SPACE FILLED | YES | THE SENDER NAME (MUST MATCH THE SENDER NAME IN FILE HEADER) | |
| RECEIVER NAME | 16 | 25 | 40 | AN(16), LEFT ALIGNED, SPACE FILLED | YES | THE RECEIVER NAME (MUST MATCH THE RECEIVER NAME IN FILE HEADER) | |
| FILE TYPE | 4 | 41 | 44 | A(4) | YES | THE FILE TYPE (MUST MATCH THE FILE TYPE IN FILE HEADER) | |
| FILE DATE | 8 | 45 | 52 | N(8), CCYYMMDD | YES | THE DATE FILE GENERATED (IN GMT TIME) (MUST MATCH THE FILE DATE IN FILE HEADER). | |
| FILE NAME | 64 | 53 | 116 | AN(48), LEFT ALIGNED, SPACE FILLED | YES | THE FILE NAME (MUST MATCH THE FILE NAME IN FILE HEADER) | |
| BATCH COUNT | 4 | 117 | 120 | N(4), RIGHT ALIGNED, 0 FILLED | YES | THE TOTAL NUMBER OF BATCHES IN THIS FILE | |
| DATA RECORD COUNT | 12 | 121 | 132 | N(12), RIGHT ALIGNED, 0 FILLED | YES | THE TOTAL NUMBER OF DATA RECORDS IN THIS FILE (EXCLUDING FILE HEADER, FILE FOOTER, BATCH HEADERS, AND BATCH FOOTERS) | |
| TOTAL RECORD COUNT | 12 | 133 | 144 | N(12), RIGHT ALIGNED, 0 FILLED | YES | THE TOTAL NUMBER OF RECORDS IN THIS FILE (INCLUDING ALL DATA RECORDS, ALL HEADERS, AND ALL FOOTERS) | |
| FILLER | | | | | NO | SPACE FILLED | |

FIG. 7A

| FIELD NAME | SIZE | FROM | TO | FORMAT | REQ'D? | DESCRIPTION | NOTES |
|---|---|---|---|---|---|---|---|
| BATCH HEADER | | | | | | | |
| RECORD IDENTIFIER | 2 | 1 | 2 | A(2) | YES | THE IDENTIFIER FOR THE RECORD TYPE. | STATIC 'BH' |
| BATCH ID | 4 | 3 | 6 | N(4), RIGHT ALIGNED, 0 FILLED | YES | THE BATCH ID (ALWAYS STARTS FROM 1 IN EACH FILE) | |
| RECON TYPE | 1 | 7 | 7 | A(1) | YES | RECONCILIATION TYPE (BATCH OR TRANSACTION) | |
| MERCHANT ID | 12 | 8 | 19 | AN(12), RIGHT ALIGNED, 0 FILLED | YES | MERCHANT ID | |
| DATE FROM | 8 | 20 | 27 | N(8), CCYYMMDD | YES | FROM DATE FOR BATCH | |
| DATE TO | 9 | 28 | 36 | N(8), CCYYMMDD | YES | TO DATE FOR BATCH | |
| CURRENCY | 3 | 37 | 39 | A(3) | YES | CURRENCY | |
| AMOUNT | 20 | 40 | 59 | N(20), RIGHT ALIGNED, 0 FILLED, WITH 4 DECIMALS. | YES | AMOUNT RECEIVED FROM THE OPERATOR FOR THE BATCH OF TRANSACTIONS | |
| TAX | 20 | 60 | 79 | N(20), RIGHT ALIGNED, 0 FILLED, WITH 4 DECIMALS. | NO | TAX | |
| BAD DEBT | 20 | 80 | 99 | N(20), RIGHT ALIGNED, 0 FILLED, WITH 4 DECIMALS. | YES | AMOUNT THAT COULD NOT BE COLLECTED FOR THE BATCH | |
| OPERATOR FEES | 20 | 100 | 119 | N(20), RIGHT ALIGNED, 0 FILLED, WITH 4 DECIMALS. | YES | FEES PAID TO THE OPERATOR | |
| VENDOR FEES | 20 | 120 | 139 | N(20), RIGHT ALIGNED, 0 FILLED, WITH 4 DECIMALS. | YES | FEES PAID TO THE VENDOR | |
| STATUS | 1 | 140 | 140 | A(1) | YES | OPEN ("O") OR CLOSED ("C") | |
| FILLER | | | | | NO | SPACE FILLED | |
| BATCH FOOTER | | | | | | | |
| RECORD IDENTIFIER | 2 | 1 | 2 | A(2) | YES | THE IDENTIFIER FOR THE RECORD TYPE | STATIC 'BF' |
| BATCH ID | 4 | 3 | 6 | N(4), RIGHT ALIGNED, 0 FILLED | YES | THE BATCH ID (MUST MATCH THE BATCH ID IN BATCH HEADER) | |
| BATCH DATA RECORD COUNT | 12 | 7 | 144 | N(12), RIGHT ALIGNED, 0 FILLED | YES | THE NUMBER OF DATA RECORDS IN THIS BATCH (EXCLUDING BATCH HEADER AND BATCH FOOTER) | |
| TOTAL BATCH RECORD COUNT | 12 | 19 | 30 | N(12), RIGHT ALIGNED, 0 FILLED | YES | THE TOTAL NUMBER OF RECORDS IN THIS BATCH (INCLUDING ALL DATA RECORDS, BATCH HEADER, AND BATCH FOOTER) | |
| FILLER | | | | | NO | SPACE FILLED | |

FIG.7B

| FIELD NAME | SIZE | FROM | TO | FORMAT | REQ'D? | DESCRIPTION | NOTES |
|---|---|---|---|---|---|---|---|
| DATA RECORD | | | | | | | |
| RECORD IDENTIFIER | 2 | 1 | 2 | A(2) | YES | THE IDENTIFIER FOR THE RECORD TYPE. | STATIC 'DR' |
| TRANSACTION ID | 32 | 3 | 34 | AN(20), LEFT ALIGNED, SPACE FILLED | YES | THE TRANSACTION ID | |
| VENDOR TRANSACTION ID | 32 | 35 | 66 | AN(32), LEFT ALIGNED, SPACE FILLED | YES | THE TRANSACTION ID IN VENDOR SYSTEM | |
| TRANSACTION DATE | 8 | 67 | 74 | N(8), CCYYMMDD | YES | TRANSACTION DATE | |
| CURRENCY | 3 | 75 | 77 | A(3) | NO | CURRENCY | |
| AMOUNT | 20 | 78 | 97 | N(20), RIGHT ALIGNED, 0 FILLED, WITH 4 DECIMALS. | NO | AMOUNT RECEIVED FROM THE OPERATOR FOR THE BATCH OF TRANSACTIONS | |
| TAX | 20 | 98 | 117 | N(20), RIGHT ALIGNED, 0 FILLED, WITH 4 DECIMALS. | NO | TAX | |
| BAD DEBT | 20 | 118 | 137 | N(20), RIGHT ALIGNED, 0 FILLED, WITH 4 DECIMALS. | NO | AMOUNT THAT COULD NOT BE COLLECTED FOR THE BATCH | |
| OPERATOR FEES | 20 | 138 | 157 | N(20), RIGHT ALIGNED, 0 FILLED, WITH 4 DECIMALS. | NO | FEES PAID TO THE OPERATOR | |
| VENDOR FEES | 20 | 158 | 177 | N(20), RIGHT ALIGNED, 0 FILLED, WITH 4 DECIMALS. | NO | FEES PAID TO THE VENDOR | |
| STATUS | 1 | 178 | 178 | A(1) | YES | OPEN ("O") OR CLOSED ("C") | |
| FILLER | | | | | NO | SPACE FILLED | |

FIG.7C

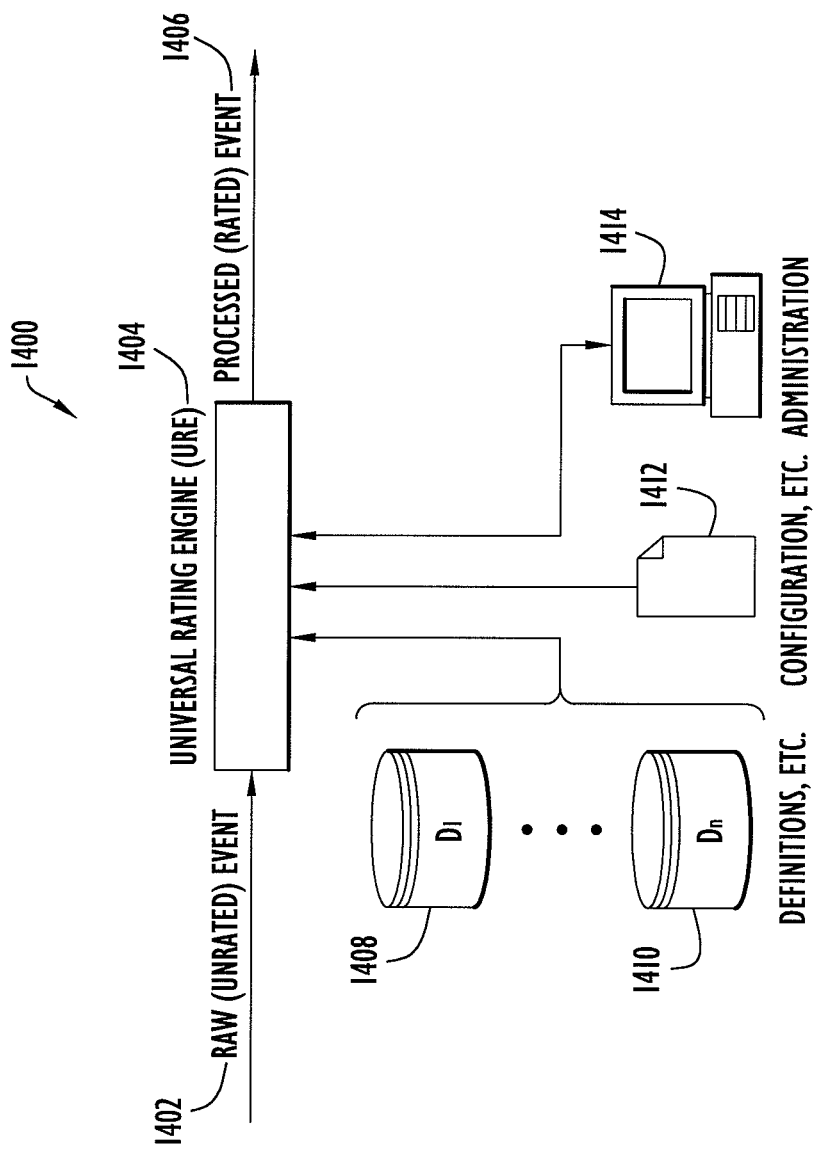

SYSTEM AND METHOD FOR OPERATOR CHARGING GATEWAY

This application claims the benefit of U.S. Provisional Patent Application No. 60/793,304, filed on Apr. 20, 2006, which is herein incorporated by reference in its entirety.

BACKGROUND

1. Field of the Invention

The present invention relates generally to telecommunications services. More particularly, the present invention relates to capabilities that enhance substantially the value and usefulness of, for example, various wireless messaging paradigms (including, inter alia, Short Message Service [SMS], Multimedia Message Service [MMS], IP Multimedia Subsystem [IMS], etc.) through a gateway facility that offers, possibly among other things, flexible and extensible charging capabilities.

2. Background of the Invention

As the 'wireless revolution' continues to march forward the ability of a Mobile Subscriber (MS), for example a user of a Wireless Device (WD) such as a mobile telephone, BlackBerry, etc. that is serviced by an Operator, to fully and completely utilize their WD to partake of services within a truly ubiquitous cross-Operator environment grows in importance while, simultaneously, the challenges that are associated with same similarly increase.

As one specific example consider Mobile Commerce (M-Commerce) which, broadly speaking, encompasses the buying and selling of Merchant-supplied products, goods, and services through WDs. A stylized, high-level depiction of a hypothetical M-Commerce environment 100 involving multiple Operators 102 and multiple Merchants 104 is presented in FIG. 1. Within an M-Commerce environment a number of factors—including, inter alia, the ever-expanding and rapidly changing universe of products/goods/services, the frequently low-value nature of those items, the practical aspects of a youth demographic (that include, for example, a lack of conventional credit cards), etc.—all contribute to the need for the separation of charging (rating, billing, etc.) activities from product/good/service delivery activities and, once separated, for the flexible, comprehensive, dynamic, sometimes non-intuitive, etc. processing and management of charging events.

Such a separation yields, among other things, a bearer-independent and delivery-agnostic charging platform that, inter alia, (a) uncouples all of the particulars of delivery from the myriad of activities, challenges, etc. of charging and (b) adds substantive value to each of the involved parties (including, for example, MS, Operator, Merchant, etc.).

The present invention facilitates aspects of such a separation and addresses various of the (not insubstantial) challenges that are associated with same.

SUMMARY OF THE INVENTION

Embodiments of the present invention provide an Operator Charging Gateway (OCG) facility within a M-Commerce environment that, among other things, provides a bearer-independent and delivery-agnostic charging platform that, inter alia, (a) uncouples all of the particulars of the delivery of content, services, etc. from the myriad of activities, challenges, etc. of charging and (b) adds substantial value to each of the involved parties (including, for example, MSs, Operators, Merchants, etc.).

In an embodiment of the invention an OCG facility may receive a purchase authorization from an external entity, perform one or more processing steps on the received purchase authorization (including at least submitting a purchase reservation to an Operator), and return an acknowledgement to the external entity. An illustrative external entity is a Content Provider (CP).

Another embodiment of the invention includes receiving a delivery confirmation notice from an external entity, performing one or more processing steps on the received delivery confirmation notice (including at least submitting delivery confirmation to an Operator), and conditionally returning an acknowledgement to the external entity.

Yet another embodiment of the invention includes receiving a rollback request from an external entity, performing one or more processing steps on the received rollback request (including at least initiating rollback with an Operator), and conditionally returning an acknowledgement to the external entity.

In another embodiment of the invention an OCG facility may employ a Pricing Scheme (PS) and/or a Contract Scheme (CS).

In yet another embodiment of the invention an OCG facility may employ a Universal Rating Engine (URE).

In another embodiment of the invention an OCG facility may employ one or more of fraud detection capabilities, multiple billing models, and multiple currencies.

These and other features of the embodiments of the present invention along with their attendant advantages will be more fully appreciated upon a reading of the following detailed description in conjunction with the associated drawings.

BRIEF DESCRIPTION OF THE DRAWINGS

FIGS. 7*a*-*c* depicts an exemplary settlement file that is possible in accordance with embodiments of the instant invention.

FIG. 14 illustrates aspects of an exemplary URE.

DETAILED DESCRIPTION OF THE INVENTION

Figure 1:
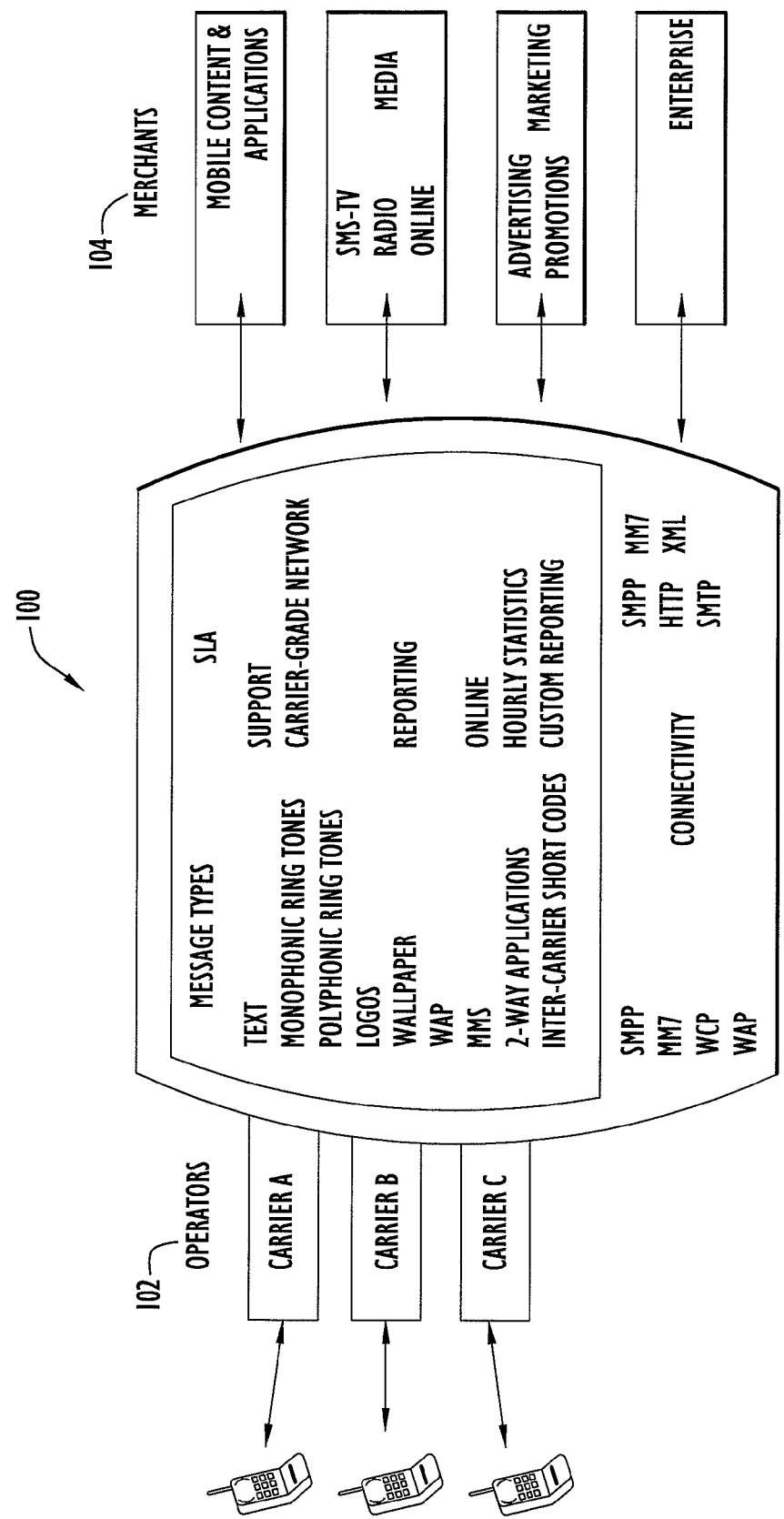
FIG. 1 presents a stylized, high-level depiction of a hypothetical M-Commerce environment.
Figure 2:
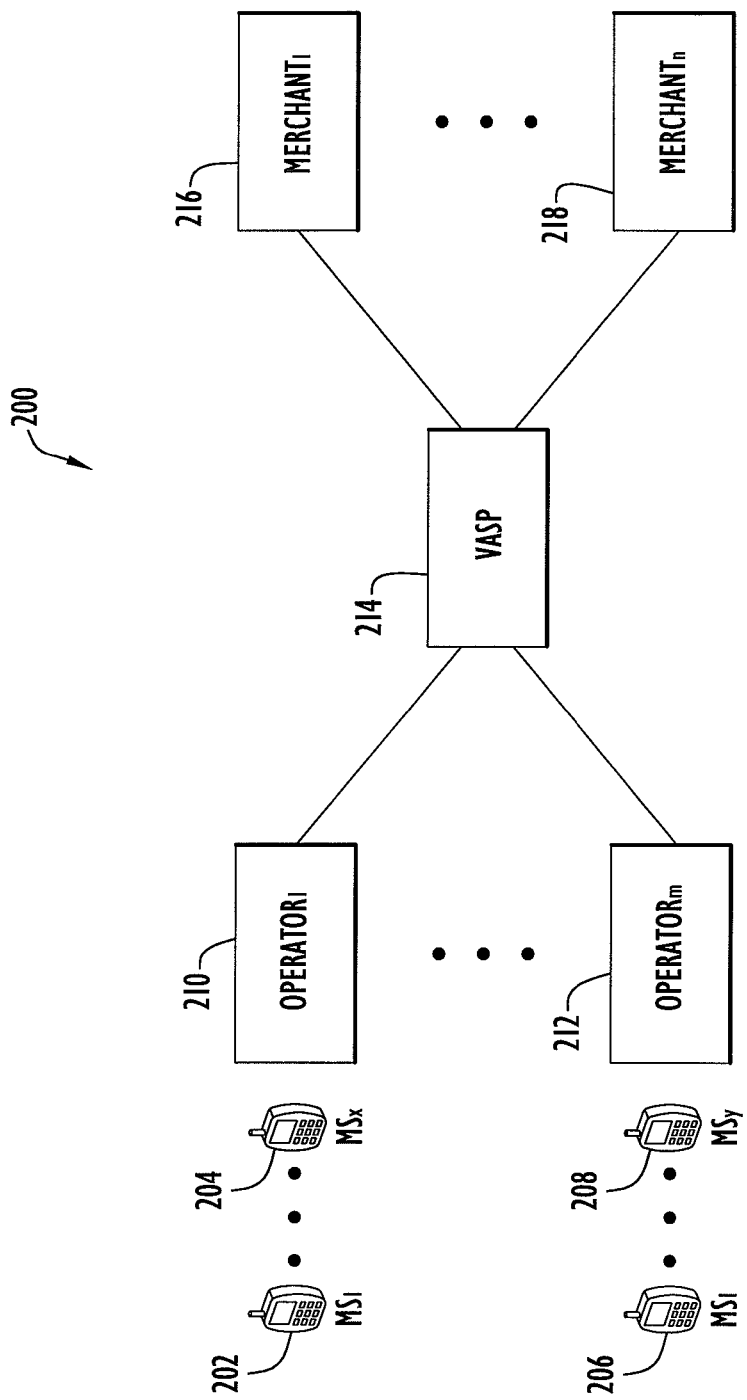
FIG. 2 illustrates the relative locations of Operators, Merchants, and an exemplary Value-Added Service Provider (VASP) in accordance with embodiments of the instant invention.

The present invention preferably leverages the capabilities of a centrally-located, full-featured VASP facility. As illustrated in FIG. 2 and reference number 200 a VASP 214 is disposed between, possibly inter alia, multiple Operators (Operator$_1$ 210→Operator$_m$ 212) on one side and multiple Merchants (Merchant$_1$ 216→Merchant$_n$ 218) on the other side. A VASP 214 thus 'bridges' all of the connected entities and may provide key interoperability services (including, inter alia, connectivity, routing, reporting, etc.) to same. For example, a VASP 214 may provide, inter alia:

1) An Operator 210→212 (and, by extension, all of the MSs 202→204 and 206→208 that are serviced by an Operator 210→212) with ubiquitous access to a broad universe of Merchants 216→218, and 2) A Merchant 216→218 with ubiquitous access to a broad universe of Operators 210→212 (and, by extension, to all of the MSs 202→204 and 206→208 that are serviced by an Operator 210→212).

Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a VASP, a summary of various of the services/functions/etc. that are performed by a VASP, and a discussion of the numerous advantages that arise from same.

While the discussion below will include a centrally-located VASP it will be readily apparent to one of ordinary skill in the relevant art that other arrangements are equally applicable and indeed are fully within the scope of the present invention.

In the discussion below aspects of the present invention are described and illustrated as being separate and apart from, for example, a CP and an Operator. However, aspects of the present invention may be realized as, for example, a third-party service bureau, an element of an Operator, an element of a VASP, multiple third-party entities working together, etc.

In the discussion below reference is made to messages that are sent, for example, between a MS and an Operator. As set forth below, a given 'message' sent between a MS and an Operator may actually comprise a series of steps in which the message is received, forwarded and routed between different entities, including possibly inter alia a MS, a VASP, etc. Thus, unless otherwise indicated, it will be understood that reference to a particular message generally includes that particular message as conveyed at any stage between an origination source, such as for example a MS, and an end receiver, such as for example an Operator. As such, reference to a particular message generally includes a series of related communications between, for example, a MS and a VASP; a VASP and an Operator; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

Figure 3:
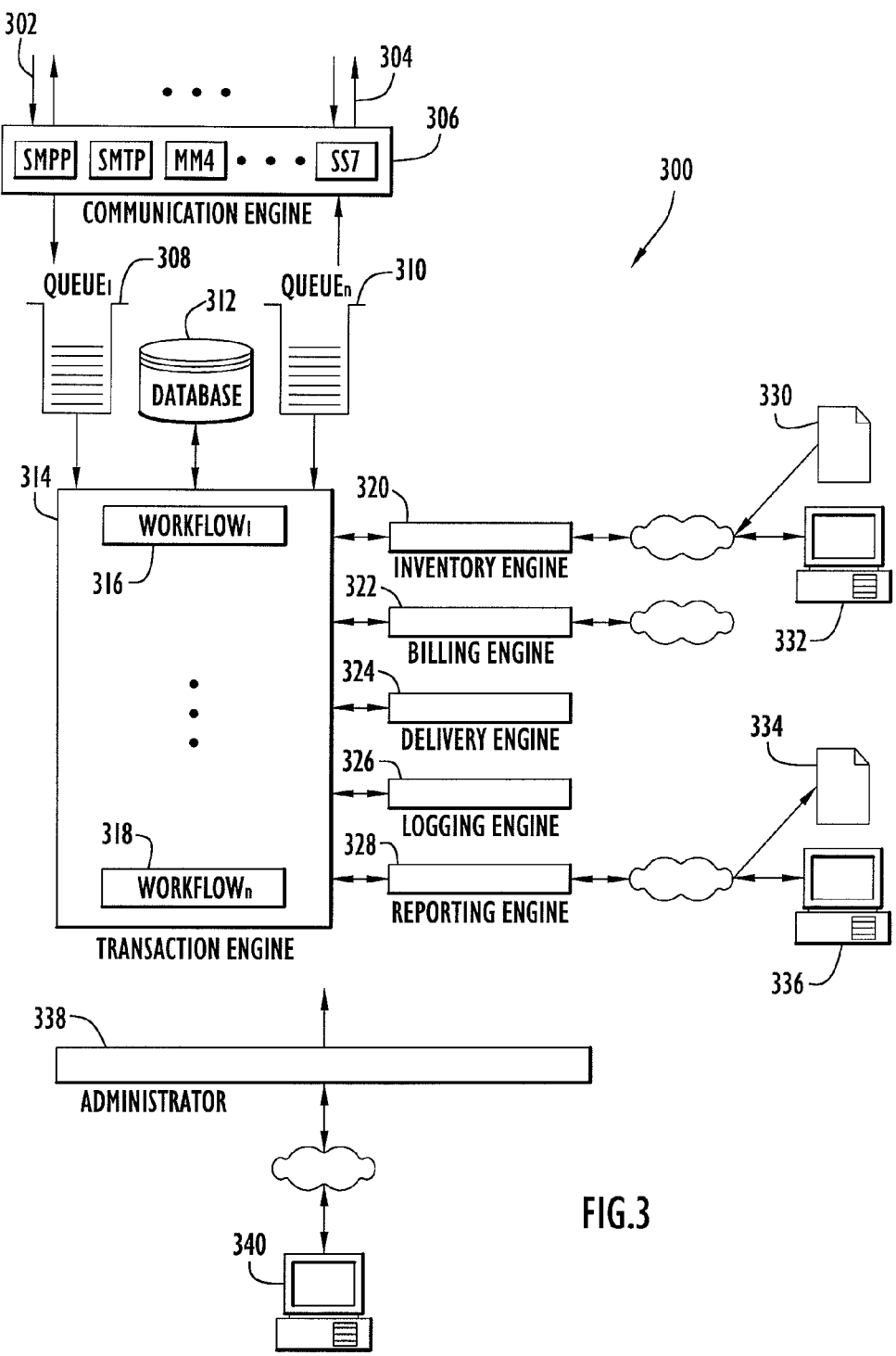
FIG. 3 illustrates various of the elements or components of an exemplary VASP.

FIG. 3 and reference number 300 provide a graphical depiction of various of the components or elements that might be found within an exemplary VASP. Of interest and note are:

A) Communication Engine (CE) 306. A CE 306 provides flexible and extensible support for a range of communication protocols (including, inter alia, Short Message Peer-to-Peer [SMPP], Simple Mail Transfer Protocol [SMTP], HyperText Transfer Protocol [HTTP], MM4, MM7, Wireless Communication Transport Protocol [WCTP] Simple Object Access Protocol [SOAP], Telelocator Alphanumeric Protocol [TAP], Signaling System No. 7 [SS7], etc.) over which outside entities may communicate 302→304 with a VASP. Support for a new protocol may be quickly realized by 'plugging' a new protocol-specific module into an internal CE 306 framework.

B) Queues 308→310. A dynamically updateable set of queues (e.g., Queue$_1$ 308→Queue$_n$ 310) operate as intermediate or temporary buffers for incoming and outgoing traffic.

C) Database 312. A logical representation of the possibly multiple physical repositories that may be implemented to support, inter alia, administrative, configuration, routing, profile, rating, transaction, inventory, etc. information. The physical repositories may be implemented through any combination of conventional Relational Database Management Systems (RDBMSs) such as Oracle, Object Database Management Systems (ODBMSs), in-memory Database Management Systems (DBMSs), etc. or through any combination of other equivalent facilities.

D) Transaction Engine (TE) 314. Within a TE 314 a dynamically updateable set of one or more WorkFlows (WorkFlow$_1$ 316→WorkFlow$_n$ 318 in the diagram) remove incoming traffic from an intermediate or temporary incoming queue (such as, for example, Queue$_1$ 308), perform all of the required processing operations, and deposit processed artifacts on an intermediate or temporary outgoing queue (such as, for example, Queue$_n$ 310). Through flexible, extensible, and dynamically updatable configuration information a WorkFlow component may be quickly and easily realized to support any number of activities.

E) Inventory Engine (IE) 320. An IE 320 provides, inter alia, means (possibly World Wide Web [WWW]-based 332, possibly data exchange-based 330, possibly Application Programming Interface [API]-based, etc.) through which entities (e.g., Merchants such as, inter alia, CPs, etc.) may identify, upload, manage, etc. inventory (which may include anything from static text and images to dynamic multimedia presentations to games to news alerts to etc.). Through an IE 320 identified inventory may be stored locally (e.g., within a VASP), stored remotely (e.g., within a Merchant such as a CP), or stored through some combination of local and/or remote means.

F) Billing Engine (BE) 322. A BE 322 provides, inter alia, comprehensive rating, charging, authorization, etc. services and includes, among other things, a façade behind which lie or reside a range of external entities including, inter alia, Operator billing environments (aspects of which are described in pending U.S. patent application Ser. No. 10/837, 695 entitled "SYSTEM AND METHOD FOR BILLING AUGMENTATION"), credit and debit card clearinghouses, banks, third-party payment services, electronic fund transfer services (such as PayPal), etc. Such a façade effectively isolates, and abstracts away, the numerous non-trivial challenges that are associated with interacting with same—access and security, communication protocols and API sets, development time and cost, potentially limited pricing logic, time-consuming and costly certification/qualification regimes, administrative and regulatory concerns, etc.

G) Delivery Engine (DE) 324. A DE 324 provides, possibly among other things, key routing, conveyance, etc. services. The routing services of a DE 324 are of considerable importance given the presence of, and the not-insignificant challenges that arise from, initiatives such as Mobile Number Portability (MNP), wireless/wireline convergence, etc. The routing services of a DE 324 may leverage ENUM and other similar facilities to, for example possibly among other things, provide authoritative lookup or resolution capabilities across any range of addressing paradigms including, inter alia, Telephone Numbers (TNs), Short Codes (SCs) (reference is made to pending U.S. patent application Ser. No. 10/742,764, entitled "UNIVERSAL SHORT CODE ADMINISTRATION FACILITY," for a description of various of the advantages [e.g., abbreviated length, such as five digits for a SC administered by Neustar under the Common Short Code {CSC} program] and challenges [e.g., management, etc.] that are associated with SCs), Session Initiation Protocol (SIP) addresses, etc.

H) Logging Engine (LE) 326. A LE 326, possibly among other things, collects logging artifacts that are generated by all of the other components/elements (e.g., CE 306, TE 314, IE 320, etc.) as those components/elements perform their individual activities and, after applying an appropriate set of configurable and dynamically-updateable processing steps, records the resulting artifacts to a repository (such as, for example, Database 312).

I) Reporting Engine (RE) 328. A RE 328 provides, possibly among other things, real-time, along with scheduled and ad hoc off-line, reporting services that may be delivered through various channels (including inter alia WWW 336, e-mail, SMS/MMS/IMS/etc. messaging, Instant Messenger [IM], API 334, etc.). To supply such reporting services a RE 324 may leverage, possibly inter alia, the contents of a repository (such as, for example, Database 312).

J) Administrator 338. An Administrator 338 provides management or administrative control over all of the different components of a VASP through, as one example, a WWW-based interface 340. It will be readily apparent to one of ordinary skill in the relevant art that numerous other interfaces (e.g., a data feed, etc.) are easily possible.

The catalog of VASP components or elements that was presented above is illustrative only and it is to be understood that it would be readily apparent to one of ordinary skill in the relevant art that other components/elements are easily possible and indeed are fully within the scope of the present invention.

Consistent with the particulars of aspects of the instant invention the balance of the present discussion will focus on the BE component or element and, more specifically, on those features, capabilities, functions, etc. of a BE that may be offered under the umbrella of an OCG.

Figure 4:
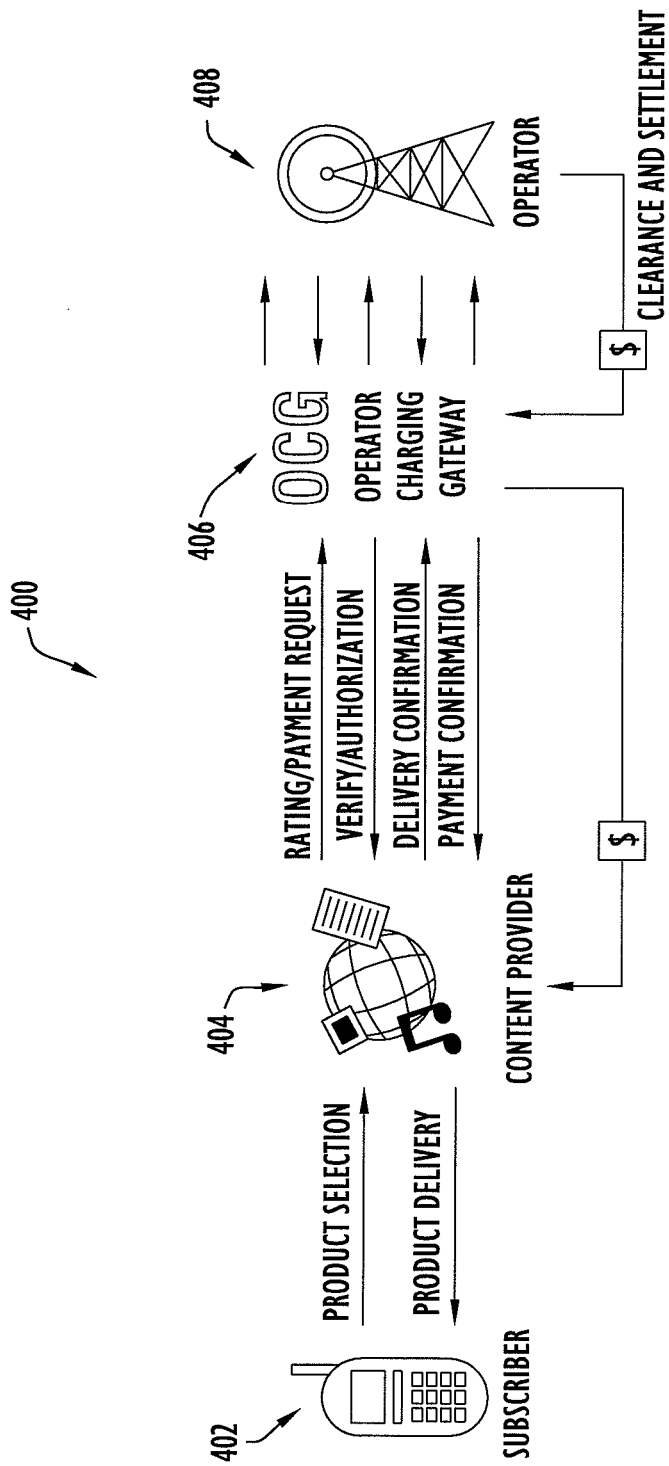
FIG. 4 illustrates at a high-level aspects of an exemplary transaction that is possible in accordance with embodiments of the instant invention.
Figure 5:
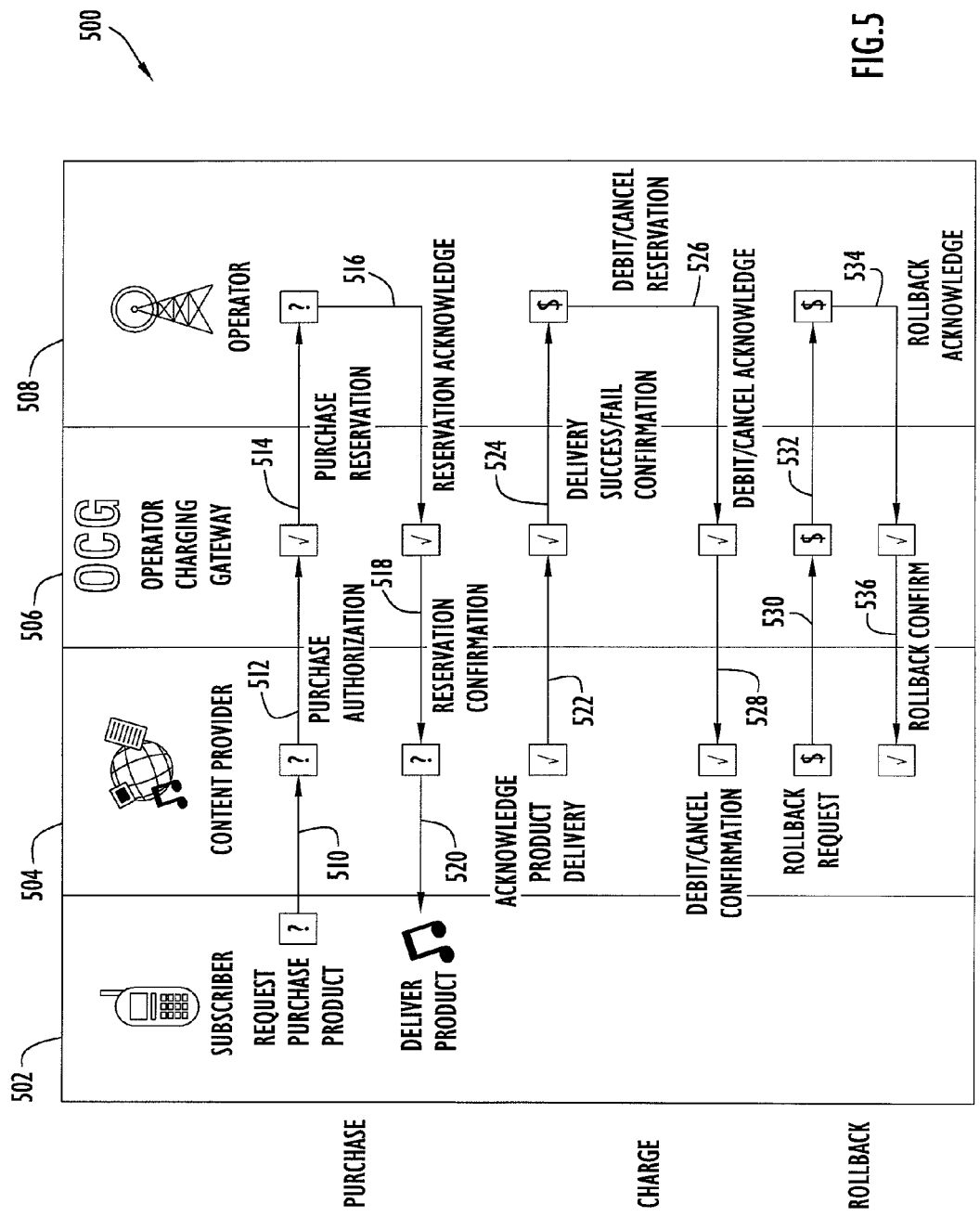
FIG. 5 provides a somewhat more detailed depiction of an exemplary transaction that is possible in accordance with embodiments of the instant invention.

For purposes of illustration consider for a moment the hypothetical transaction that is depicted briefly in FIG. 4 (and reference number 400) and more fully in FIG. 5 (and reference number 500). As illustrated through FIG. 5 and reference number 500 a series of exchanges or interactions (under ultimate direction of one or more TE WorkFlows) may be supported by an OCG, including:

A) Product/service/good request. For example, a MS 502 issues a request 510 to a CP 504 for a product, service, or good.

B) Authorization/Reservation. For example, a CP 504 submits a purchase authorization 512 to an OCG 506 and, in turn, the OCG 506 initiates a purchase reservation 514 (to, for example, an Operator 508). The OCG 506 may return an acknowledgement 518 to the CP 504.

C) Fulfillment. For example, the CP 504 delivers the requested product/service/good 520 to the MS 502.

D) Fulfillment acknowledgement. For example, a CP 504 may dispatch a delivery confirmation notice 522 (e.g., successful fulfillment, unsuccessful fulfillment, etc.) to an OCG 506 and, in turn, the OCG 506 may submit such a notice 524 to, for example, an Operator 508.

E) Charge/cancel confirmation and acknowledgement. For example, confirmation and acknowledgement may be passed back to an OCG 506 (via 526) and, optionally, to a CP 504 (via 528).

F) Rollback. For example, if required a CP 504 may submit a rollback request 530 to an OCG 506. Confirmation and acknowledgement of the rollback (from, e.g., an Operator 508) may be passed back to an OCG 506 (via 534) and, optionally, to a CP 504 (via 536).

The exchanges or interactions that were presented above are illustrative only and it is to be understood that it would be readily apparent to one of ordinary skill in the relevant art that other exchanges/interactions are easily possible and indeed are fully within the scope of the present invention.

Figure 6:
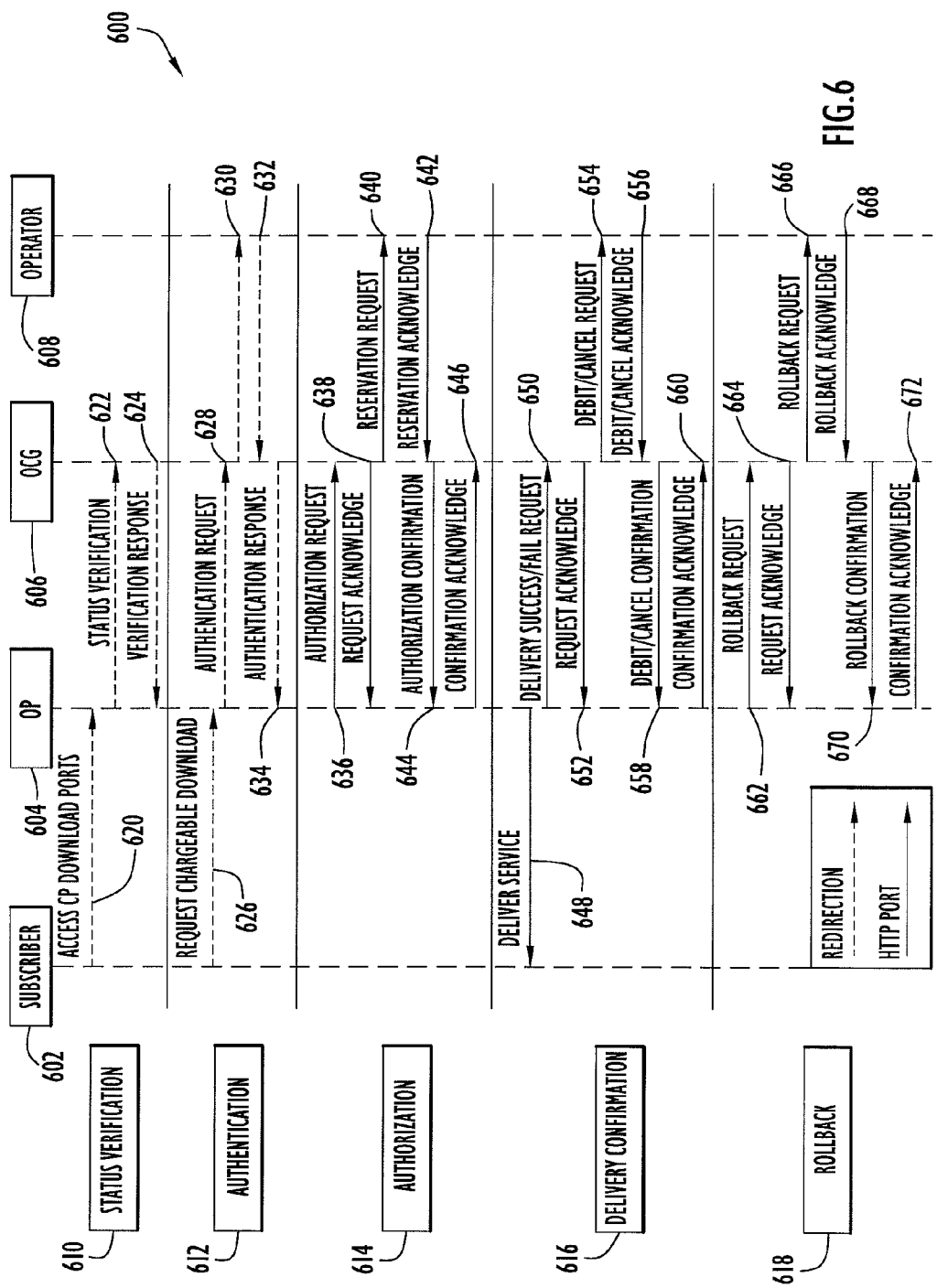
FIG. 6 provides a further (more detailed) depiction of an exemplary transaction that is possible in accordance with embodiments of the instant invention.

The individual exchanges or interactions that were described above are illustrated in somewhat more detail (within the context of a download transaction involving a CP) in FIG. 6 and reference number 600:

A) Status Verification 610. For example, a MS 602 issues a request 620 to a CP 604 for a product, service, or good and the CP 604 subsequently verifies same 622→624 through an OCG 606.

B) Authentication 612. For example, based on a MS' 602 request 626 a CP 604 dispatches an authentication request 628 to an OCG 606 and, in turn, the OCG 606 submits such a request 630 to, for example, an Operator 608. Confirmation and acknowledgement (from, e.g., an Operator 608) may be passed back to an OCG 606 (via 632) and, optionally, to a CP 604 (via 634).

C) Authorization 614. For example, a CP 604 submits an authorization request 636 to an OCG 606. The OCG 606, following the completion of various internal processing steps involving possibly among other things an OCG's URE (discussed in detail below), initiates a reservation request (to, for example, an Operator 608) via 640. The OCG 606 may return an acknowledgement 644 to the CP 604.

D) Delivery Confirmation 616. For example, a CP 604 may dispatch a delivery confirmation notice (e.g., successful fulfillment, unsuccessful fulfillment, etc.) to an OCG 606 (via 650) and, in turn, the OCG 606 may submit such a notice to, for example, an Operator 608 (via 654). Confirmation and acknowledgement (from, e.g., an Operator 608) may be passed back to an OCG 606 (via 656) and, optionally, to a CP 604 (via 658).

E) Rollback 618. For example, if required a CP 604 may submit a rollback request 662 to an OCG 606. Confirmation and acknowledgement of the rollback (from, e.g., an Operator 608) may be passed back to an OCG 606 (via 668) and, optionally, to a CP 604 (via 670).

Thus an OCG provides a range of key services or functions.

An OCG may aid in bridging the 'impedance imbalance' that may exist between, for example, Operators (who may be large, monolithic, slow to change, subject to numerous regulatory and other constraints, etc.) and Merchants (and other similarly-situated entities who may desire to respond quickly to market pressures, who may need to package/price/distribute time-sensitive content [new music, an upcoming movie, news alerts, etc.] quickly and creatively, etc.).

An OCG may support a number of different delivery business models including, inter alia:

1) Push. For example, a VASP may purchase capacity/bandwidth/etc. in bulk from various operators and then re-sell same to one or more Merchants under any number of pricing plans.

2) Revenue Share. For example, an Operator may collect funds from an MS for products/services/goods consumed and then dispatch some portion (or share or percentage) of those funds to a VASP who may, in turn, dispatch some portion (or share or percentage) of the amounts received to one or more Merchants based on any number of distribution schemes or models.

The reporting services that may be offered by a VASP may support or otherwise facilitate aspects of the process of funds settlement across all of the different entities that may exist upstream of the VASP (e.g., one or more Operators) and/or downstream of the VASP (e.g., one or more Merchants). For purposes of illustration consider for a moment the following hypothetical example:

A) Operator X collects 100% of the charges that are assessed for transactions involving their MSs for applicable products/services/goods during a specified time interval. The collected funds are dispatched, or reported, or etc. to a VASP.

B) For the first 10% of transaction volume the collected funds are to be distributed by the VASP as follows:
 1) 40% to Merchant Y
 2) 40% to Operator X
 3) 20% to VASP C) Following the first 10% of transaction volume, and up to 50% of transaction volume, the collected funds are to be distributed by the VASP as follows:
 1) 35% to Merchant Y
 2) 35% to Operator X
 3) 30% to VASP D) For the remaining transaction volume the collected funds are to be distributed by the VASP as follows:
 1) 33% to Merchant Y
 2) 33% to Operator X
 3) 34% to VASP The example that was presented above is illustrative only and it is to be understood that it would be readily apparent to one of ordinary skill in the relevant art that numerous other allocations, distributions, etc., and arrangement of same, are easily possible and indeed are fully within the scope of the present invention.

An OCG may optionally generate one or more data files including, inter alia, a (daily, weekly, monthly, etc.) settlement file (see FIGS. 7a-c for an illustrative example), a daily reconciliation file, etc.

An OCG may provide a flexible, extensible, and dynamically configurable set of checks and balances that work together to ensure, among other things, that delivery (of a product, good, service, etc.) does not take place unless the requisite financial transaction(s) are successfully completed; that a MS is not billed unless delivery (of a product, good, service, etc.) is successfully completed; etc.

An OCG may optionally leverage a body of flexible, extensible, and dynamically updatable rules/logic/etc. to perform real-time analysis of all of the activity that transits its borders in support of, inter alia, the comprehensive detection of fraudulent activity.

The real-time reporting that an OCG may provide may be used by a Merchant to, for example, support immediate adjustments to the pricing of their products/goods/services as the volumes of transactions, sales, etc. are monitored so as to entice or otherwise stimulate further purchases, etc.

An OCG may provide support for, possibly inter alia:
A) Multiple currencies with the optional application of real-time conversation rates.

B) An internal neutral or pseudo currency (with mappings or conversions, as appropriate and as required, to/from supported real-world currencies).

C) Numerous subscription (or recurring purchase) plans.

D) Variable billing cycles (e.g., by the minute, hourly, daily, weekly, monthly, quarterly, annual, by bandwidth consumed, by volume transferred, etc.).

E) Numerous pre-paid models (including, for example, line of credit, debit card or mechanism, etc.). Under a pre-paid model a MS may secure (e.g., through the purchase of a phone card or through any other functionally equivalent means) a specified number of units (e.g., credits, messages, etc.) that may subsequently be consumed at defined rates during the processing of events. Under such a model an OCG may optionally interact with a MS' Operator to, for example, pre-approve different aspects of a transaction.

Figure 8:
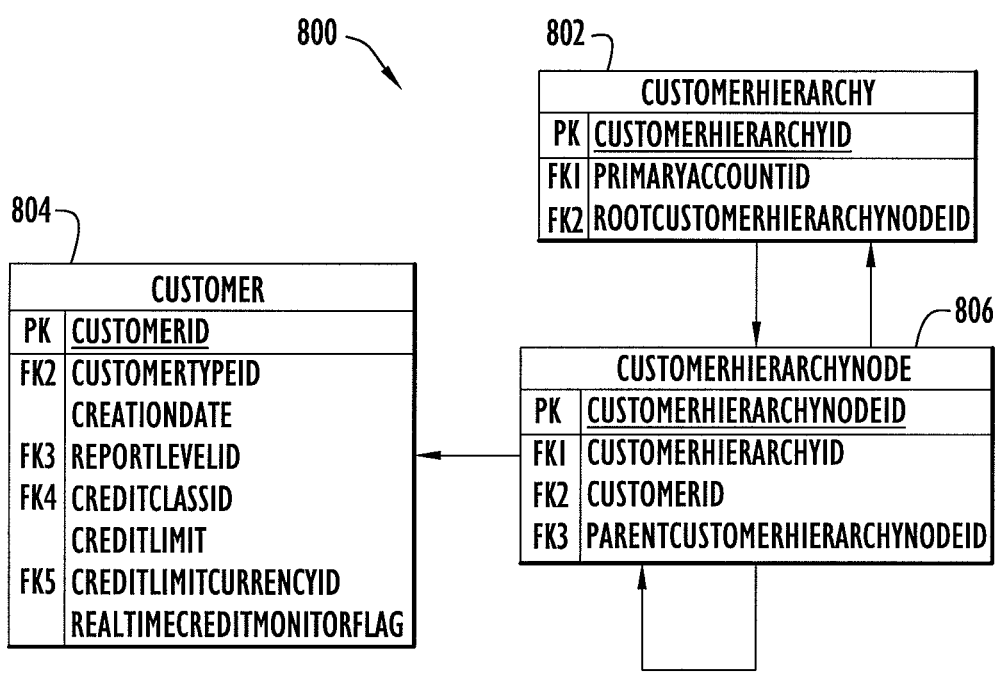
FIG. 8 depicts an exemplary data model that provides hierarchical aggregation capabilities for a hypothetical 'Customer.'

F) The flexible, extensible, and dynamic hierarchical aggregation of entities (e.g., Merchants, Operators, etc.) with, optionally, the distribution of (charge, payment, etc.) amounts up and down the hierarchy through, inter alia, dynamically-updateable rules. As one example, consider the data model that is depicted in FIG. 8 (and reference number 800) and which provides such support for a generic Customer 804.

Figure 9:
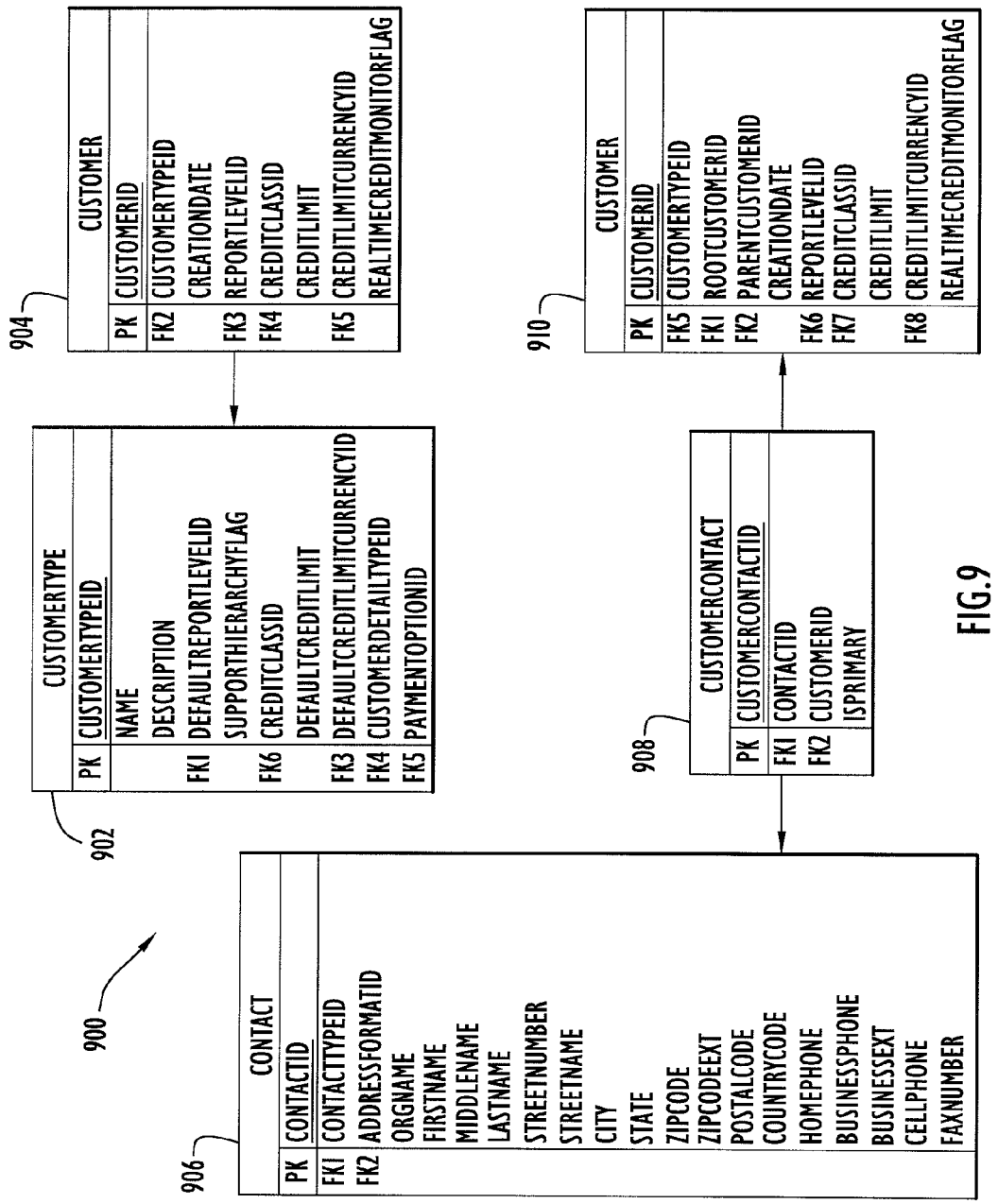
FIG. 9 depicts an exemplary data model that provides partial profile capabilities for a hypothetical 'Customer.'

G) The use of Profiles for various entities (e.g., Merchants, Operators, etc.). As one example, consider the data model that is depicted in FIG. 9 (and reference number 900) and which provides such support for various aspects (902, 906, 908) of a generic Customer (904, 910).

An OCG may employ a number of internal artifacts, structures, etc. in support of its activities. One such entity is a PS. A PS is a self-contained framework for capturing all of the particulars associated with cost and may include, possibly among other things, elements such as:

1) Descriptive Information. A range of descriptive or identifying information that may include, possibly inter alia, a unique identifier, a description (that may be displayed, that may be conveyed to an Operator for inclusion in a line-item on a MS monthly statement, etc.), effective dates/times, etc.

2) Interval. The starting point (e.g., the first of each month) and the duration (e.g., one calendar month) of the interval or cycle during which cost is accumulated.

3) Pre Amounts. Zero, one, or more fixed (e.g., $5.00) or variable (e.g., $0.05 times the number of items processed) amounts that contribute to an interval's overall or aggregate cost amount. A Pre Amount may be either a charge (a positive amount) or a discount (a negative amount) and may include, possibly inter alia, set-up fees, monthly service charges, etc.

4) Base Amount. The particulars that are applied to each event to rate, or determine the cost of, an event. Numerous plans or models are available to select from, including inter alia Static-Flat Rate-Basic (e.g., a single, fixed price), Static-Flat Rate-Tiered (e.g., price is derived from, inter alia, volume through defined thresholds or plateaus), etc. It is important to note that the preceding catalog of plans is illustrative only; it will be readily apparent to one of ordinary skill in the relevant art that other plans may be easily added.

5) Post Amounts. Zero, one, or more fixed (e.g., $1.00) or variable (e.g., 2% of the aggregate interval cost) amounts that contribute to an interval's overall or aggregate cost. A Post Amount may be either a charge (a positive amount) or a discount (a negative amount).

Figure 10:
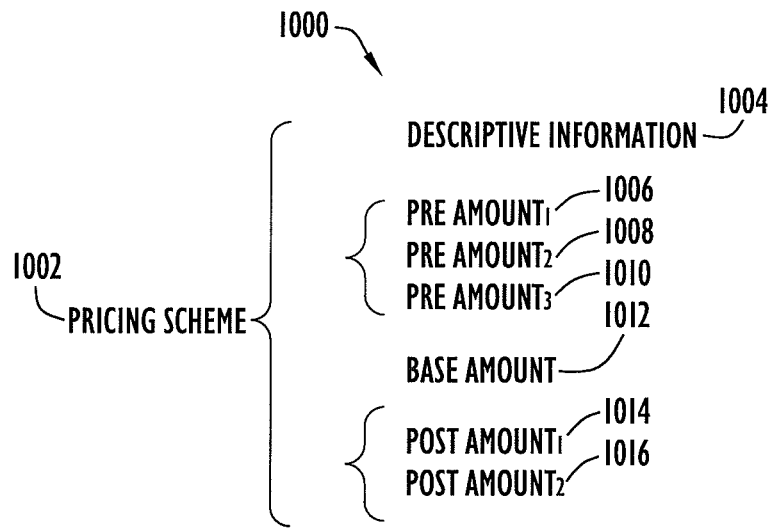
FIG. 10 illustrates an exemplary PS.

For purposes of illustration, consider the hypothetical PS 1002 that is illustrated in FIG. 10 (and reference number 1000) which includes three (3) Pre Amounts (1006→1010), one (1) Base Amount 1012, and two (2) Post Amounts (1014→1016).

It should be noted that the specific PS that was just presented is illustrative only. It will be readily apparent to one or ordinary skill in the relevant art that the inclusion of different elements and/or alternative arrangements of the elements are easily possible.

One or more PSs may be associated with a Contract. A Contract may contain, possibly inter alia, descriptive information (e.g., a unique identifier, a description, etc.), all applicable terms and conditions (e.g., including support for one or more levels of optional taxation by, possibly inter alia, geography, national entity, etc.), etc.

Figure 11:
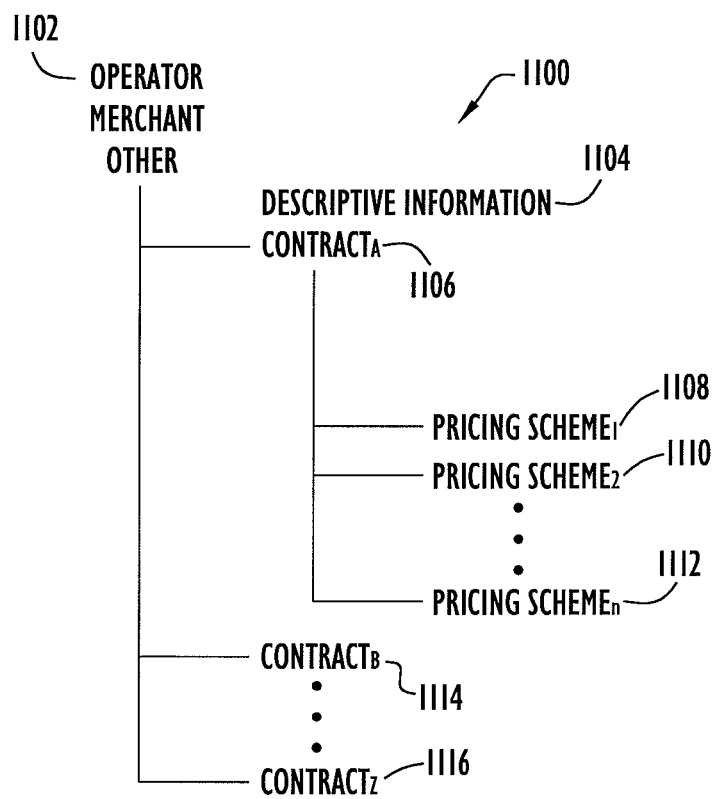
FIG. 11 illustrates an exemplary CS.

One or more Contracts may be associated with an Operator, Merchant, etc. through a CS. For purposes of illustration consider the hypothetical CS 1100 that is presented in FIG. 11. The depicted CS 1100 employs a flexible and extensible ontology that easily supports multiple contracts (1106, 1114, 1116) per Operator/Merchant/etc 1102. A contract may include a Pricing Scheme$_1$→Pricing Scheme$_n$ (1108, 1110, 1112). Descriptive material may also be associated with a given Operator/Merchant 102.

A specific item of inventory may optionally be associated with a PS through a Stock Keeping Unit (SKU). A SKU may contain, possibly inter alia, descriptive information (e.g., a unique identifier, a description, etc.), temporal (i.e., date/time) constraints, etc.

It is important to note that the discussion of internal artifacts, structures, etc. that was just presented was illustrative only. It will be readily apparent to one of ordinary skill in the relevant art that numerous other artifacts/structures/etc., and alternative arrangements of same, are easily possible.

Figure 12:
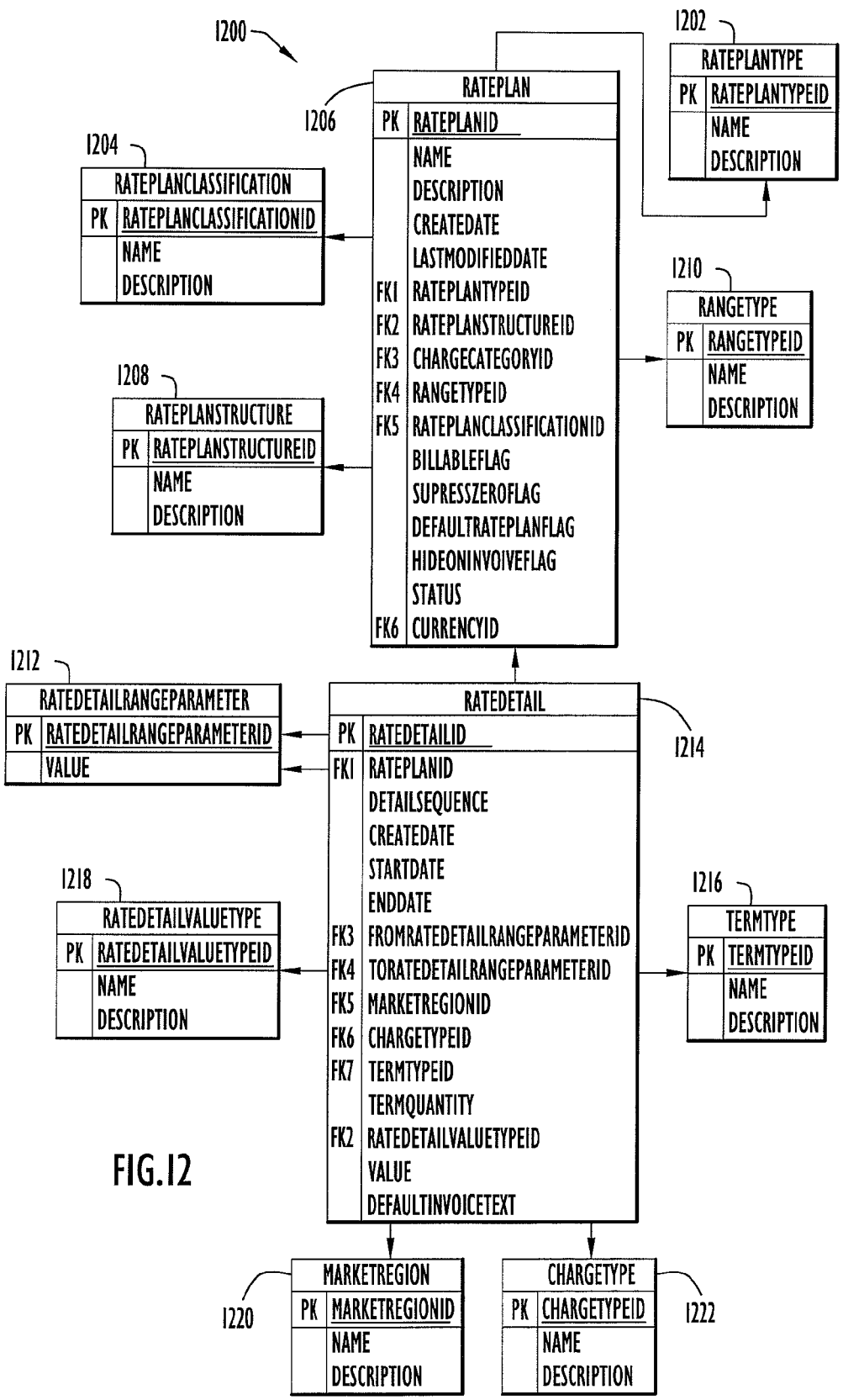
FIG. 12 depicts an exemplary data model that provides partial support for a hypothetical 'Rate Plan.'
Figure 13:
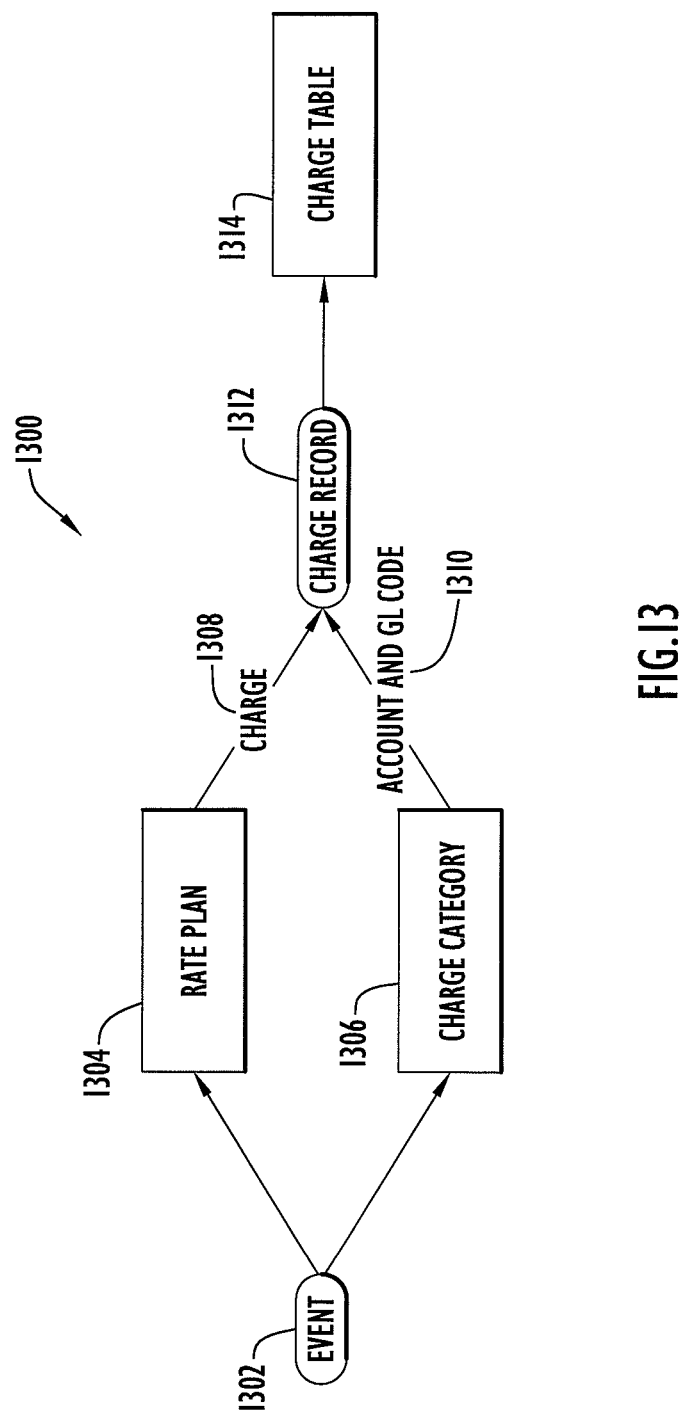
FIG. 13 depicts aspects of the hypothetical rating of an event.

Various of an OCG's internal artifacts, structures, etc. (e.g., possibly expressed through data models similar to the hypothetical 'Rate Plan' data model that is presented in FIG. 12 [and reference number 1200]) may be used by an OCG's URE facility (see, for example, FIG. 13 [and reference number 1300]) to flexibly and dynamically rate events—e.g., the downloading of a ringtone, the downloading of and the subsequent participation in a multi-party interactive game, the dispatch/receipt of a (stock, news, travel, weather, etc.) alert, etc. As illustrated in FIG. 14 (and reference number 1400) a hypothetical URE 1404 may accept as input a raw (or unrated) event 1402; leverage a pool of flexible, extensible, and dynamically configurable definitional 1408→1410 and configuration 1412 information; and produce as output a processed (or rated) event 1406.

Under certain circumstances a URE may, during its rating of an event, identify the need to 'go back' and re-rate one or more previously-rated events (to, for example, apply some updated/corrected/different/etc. amount, apply some volume-sensitive increase or decrease, etc.). Additionally, a URE may optionally draw upon estimated message volume projections (e.g., extrapolated from historical message volumes, etc.) to artificially align a volume-sensitive Base Amount plan to what is anticipated to be the final message volume at the end of the instant cycle so as to continuously maintain a real-time exact amount charged (and thus obviate any number of intermediate 'go back and re-rate' operations).

These and other properties optionally enable an OCG to continuously maintain accurate, up-to-date event rating amounts so that the OCG can, at any moment in time, authoritatively respond to any inquiry quickly, in real-time, with an exact amount charged.

Various of the messages that were identified during the preceding exchanges/interactions descriptions may optionally contain an informational element—e.g., 'Thank you for using our service!', etc.—that is provided through an OCG. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service [LBS] facility).

The messages may also optionally contain advertising—e.g., textual material if an SMS model is being utilized, or multimedia (images of brand logos, sound, video snippets, etc.) material if another (suitably capable) model is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

The messages may also optionally contain promotional materials (e.g., static text, still images, video clips, etc.).

It is important to note that while aspects of the discussion that was presented above focused on the use of SCs, it will be readily apparent to one of ordinary skill in the relevant art that TNs and other message address identifiers are equally applicable and, indeed, are fully within the scope of the present invention.

The discussion that was just presented referenced the specific wireless messaging paradigms SMS and MMS. These paradigms potentially offer an incremental advantage over other paradigms in that native support for SMS and/or MMS is commonly found on a WD that a potential MS would be carrying. However, it is to be understood that it would be readily apparent to one of ordinary skill in the relevant art that other paradigms (IMS, etc.) are fully within the scope of the present invention.

It is important to note that the hypothetical example that was presented above, which was described in the narrative and which was illustrated in the accompanying figures, is exemplary only. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| API | Application Programming Interface |
| BE | Billing Engine |
| CE | Communication Engine |
| CP | Content Provider |
| CS | Contract Scheme |
| CSC | Common Short Code |
| DBMS | Database Management System |
| DE | Delivery Engine |
| HTTP | HyperText Transfer Protocol |
| IE | Inventory Engine |
| IM | Instant Messenger |
| IMS | IP Multimedia Subsystem |
| LBS | Location-Based Service |
| LE | Logging Engine |
| MMS | Multimedia Message Service |
| MNP | Mobile Number Portability |
| MS | Mobile Subscriber |
| OCG | Operator Charging Gateway |
| ODBMS | Object Database Management System |
| PS | Pricing Scheme |
| RDBMS | Relational Database Management System |
| RE | Reporting Engine |
| SC | Short Code |
| SIP | Session Initiation Protocol |

-continued

| Acronym | Meaning |
| --- | --- |
| SKU | Stock Keeping Unit |
| SMPP | Short Message Peer-to-Peer |
| SMS | Short Message Service |
| SMTP | Simple Message Transfer Protocol |
| SOAP | Simple Object Access Protocol |
| SS7 | Signaling System No. 7 |
| TAP | Telelocator Alphanumeric Protocol |
| TE | Transaction Engine |
| TN | Telephone Number |
| URE | Universal Rating Engine |
| VASP | Value-Added Service Provider |
| WCTP | Wireless Communication Transport Protocol |
| WD | Wireless Device |
| WWW | World Wide Web |

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the relevant art in light of the above disclosure.

What is claimed is:

1. A method for operating an operator charging gateway, comprising:
   receiving a purchase authorization from a content provider, said purchase authorization having been triggered by a purchase request for a product or service from a mobile subscriber;
   rating said purchase authorization triggered by said purchase request using a universal rating engine, including estimating message volume projections, extrapolated from historical message volumes, to calculate an amount for a volume-sensitive amount pricing plan;
   sending a purchase reservation to an operator providing wireless service to said mobile subscriber;
   receiving from said operator a reservation acknowledgement in response to said purchase reservation;
   in response to said reservation acknowledgement, sending a reservation confirmation to said content provider that authorizes said content provider to deliver the product or service to said mobile subscriber.

2. The method of claim 1, wherein said reservation acknowledgement includes at least one short message service (SMS) message.

3. The method of claim 1, wherein said reservation acknowledgement includes at least one multimedia message service (MMS) message.

4. The method of claim 1, wherein said universal rating engine determines a price for said product or service based on a predetermined pricing structure.

5. The method of claim 1, wherein said universal rating engine determines a price for said product or service based on a predetermined contract structure.

6. The method of claim 1, wherein said universal rating engine re-rates a price for a previously rated product or service.

7. The method of claim 1, further comprising:
   receiving a rollback request from said content provider;
   performing one or more processing steps on said rollback request including at least initiating rollback with said operator; and
   returning a rollback acknowledgement of said rollback request to said content provider.

8. The method of claim 7, wherein said rollback acknowledgement includes at least one SMS message.

9. The method of claim 7, wherein said rollback acknowledgement includes at least one MMS message.

10. The method of claim 1, further comprising responding to an inquiry about an amount charged.

11. The method of claim 1, further comprising:
    detecting fraudulent activities.

12. The method of claim 1, further comprising:
    processing financial transactions according to one of a plurality of billing models.

13. The method of claim 12, wherein one of said billing models is a revenue share model.

14. The method of claim 1, further comprising:
    settling financial transactions.

* * * * *